United States Patent
Okada et al.

(10) Patent No.: US 6,521,679 B1
(45) Date of Patent: Feb. 18, 2003

(54) POLYESTER AQUEOUS DISPERSION AND METHOD FOR PREPARATION THEREOF

(75) Inventors: Yasuo Okada, Yamaguchi-ken (JP); Hidenori Kaya, Yamaguchi-ken (JP); Suguru Tokita, Yamaguchi-ken (JP)

(73) Assignee: Mitsui Chemicals, Inc., Tokyo (JP)

( * ) Notice: Subject to any disclaimer, the term of this patent is extended or adjusted under 35 U.S.C. 154(b) by 19 days.

(21) Appl. No.: 09/786,205

(22) PCT Filed: Jun. 30, 2000

(86) PCT No.: PCT/JP00/04332
§ 371 (c)(1),
(2), (4) Date: Mar. 2, 2001

(87) PCT Pub. No.: WO01/02490
PCT Pub. Date: Jan. 11, 2001

(30) Foreign Application Priority Data

Jul. 2, 1999 (JP) .............................. 11-189266

(51) Int. Cl.$^7$ .............................. C08J 3/05; C08L 67/00
(52) U.S. Cl. ....................... 523/336; 524/603; 524/801; 524/845
(58) Field of Search ................................. 524/801, 845, 524/603; 523/336

(56) References Cited

U.S. PATENT DOCUMENTS 4,340,519 A * 7/1982 Kotera et al.
5,306,606 A * 4/1994 Tachibana et al.

FOREIGN PATENT DOCUMENTS

JP 3234760 * 10/1991
JP 8295792 * 11/1996

* cited by examiner

Primary Examiner—Tae H. Yoon
(74) Attorney, Agent, or Firm—Birch, Stewart, Kolasch & Birch, LLP

(57) ABSTRACT

A polyester aqueous dispersion having excellent properties in waterproof, weatherproof, processibility and adhesion, which provides a large allowance for controlling liquid physical properties by post treatment and is advantageous in making dry powders from the dispersion, and an efficient method for preparing the aqueous dispersion at low costs in a simple manner. The polyester aqueous dispersion comprising (i) a water-insoluble polyester and (ii) a polyester containing a sulfonate group bound to a polymer in a concentration of 0.1 to 1.5 mmol equivalents when calculated as —$SO_3^-$ group per gram of the polymer, and method for preparing a polyester aqueous dispersion comprises a step of melt-kneading a resin composition comprising the water-insoluble polyester (i) and polyester (ii) and a step of phase inversion of adding water or a basic aqueous solution to the molten kneaded mixture thereby to shift the resin composition into the aqueous dispersion.

19 Claims, No Drawings

POLYESTER AQUEOUS DISPERSION AND METHOD FOR PREPARATION THEREOF

This application is the national phase under 35 U.S.C. §371 of PCT International Application No. PCT/JP00/04332 which has an International filing date of Jun. 30, 2000, which designated the United States of America.

TECHNICAL FIELD

The present invention relates to a polyester aqueous dispersion having excellent properties in waterproof, weatherproof, processibility, adhesion, etc. and a method for preparing the aqueous dispersion in a high efficiency at low production costs.

TECHNICAL BACKGROUND

Organic solvents have been heretofore employed in large quantities in the fields of paints, ink, coating agents, adhesives, primers and various agents for treating fiber materials or paper. However, a shift to a technology of using alternative materials for the organic solvent has been desired in view of saving petroleum resources, prevention of environmental pollution, improvement on safety in terms of flammability, etc., improvement in the working environment or the like in these years. For these purposes, a variety of techniques using the aqueous system, powder system or high solids system, etc. have been proposed and attempted to apply these techniques so far. Inter alia, aqueous dispersions are most suitable for general-purpose use because of easy handling and are considered to be promising.

As substances for use in aqueous dispersions, polyester type resins will be potential candidates that are to be used widely in the application fields of paints, ink, coating agents, adhesives, primers, etc., since these resins possess excellent coating processability and good adhesion to various base materials.

In view of the foregoing state of art, it has been attempted to develop techniques that enable to use polyester type resins in the aqueous system but special plants or complicated production steps are required or introduction of hydrophilic groups into the resins results in a reduced waterproof property. Thus, it is the actual situation that any useful technique has not yet been developed in terms of industrial application.

For the aqueous dispersion system of polyester, for example, a method through graft modification of low molecular weight polyesters is known by U.S. Pat. No. 3,634,351, Japanese Patent Publication No. Sho 57-57065 and U.S. Pat. No. 4,517,322. Furthermore, Japanese Patent Application Laid-Open Nos. Sho 59-223374 and 62-225510, Japanese Patent Publication No. Sho 61-57874 and Japanese Patent Application Laid-Open No. Hei 3-294322 are known to provide unsaturated copolymerized polyesters of high molecular weight. However, these proposals are yet unsatisfactory in terms of adhesion, processibility or productivity.

For dispersion of high molecular weight copolymerized polyester resins in water, there is also known a method for copolymerizing hydrophilic raw materials in copolymerized polyester resins. For example, methods for homopolymerizing or copolymerizing materials containing raw material containing metal sulfonates group, polyalkylene glycol or aliphatic dicarboxylic acids, etc. are also known (e.g., see Japanese Patent Application Laid-Open Nos. Hei 3-234760, 7-216210 and 8-245769).

Polyester dispersions may be obtained either by dispersing these polyester resins in water-containing solvent all together or by previously dissolving polyester resins in an organic solvent and then adding water to the solution at a later step.

In the aqueous dispersion thus obtained, however, many hydrophilic groups are introduced into the resins so that the resulting films and fine particles are extremely hygroscopic. For this reason, waterproof, weatherproof and adhesion properties are poor. Moreover, when large quantities of resins are dissolved in a small amount of organic solvent, a very heavy load is placed on production facilities such as a dissolution tank equipped with a stirrer and, it takes long time until resins are dissolved, which leads to increased costs. These were the defects in preparation.

In addition, conventional techniques for converting polyesters to the aqueous dispersion system only give aqueous dispersions of low solid contents, which encounter various problems for practical use. For instance, problems involved are the large volume due to a large quantity of water, which in turn requires extensive space and much labor for storage, packaging, transportation, etc.; freezing at low temperatures; limited allowances in controlling physical properties of liquid such as solid contents, pH, viscosity, etc.; and much time and energy are required for drying to powders.

As described above, the foregoing polyester aqueous dispersions proposed by conventional techniques involved various problems to be solved in terms of physical properties, production and practical use.

As one proposal to solve the problems described above, Japanese Patent Publication No. Hei 7-8933 discloses an aqueous dispersion containing an olefin resin, an olefin polymer containing a specific amount of carboxylates, an anionic surfactant and water, as well as a method for preparing the aqueous dispersion by adding a specific amount of basic material and water to a molten kneaded mixture thereby to cause phase inversion of the molten resin into the desired aqueous dispersion. Japanese Patent Application Laid-Open No. Hei 10-139884 discloses a method in which ionic functional groups or functional groups that can be converted into ionic groups are dispersed in an aqueous dispersion medium using a twin screw extruder.

The present inventors extensively investigated techniques that could produce superior polyester aqueous dispersions to those known proposals and as a result, have reached the present invention.

DISCLOSURE OF THE INVENTION

An object of the present invention is to provide a polyester aqueous dispersion having excellent properties in waterproof, weatherproof, processibility, adhesion, etc., which can control physical properties more freely by post-treatment and is also advantageous in converting the dispersion into dry powders.

Another object of the invention is to provide a method for preparing such a polyester aqueous dispersion having excellent properties efficiently and readily at low costs.

In order to achieve the foregoing objects, the inventors have made further studies. As a result, the inventors have found that for preparing the aqueous dispersion of polyester (i), polyester (ii) having a good compatibility with (i) and containing a specific amount of sulfonates as a hydrophilic group is extremely effective as a dispersing agent.

That is, the present invention provides a polyester aqueous dispersion comprising:

(A) a water-insoluble polyester (i) and, (B) a polyester (ii) containing a sulfonate group bound to a polymer in a concentration of 0.1 to 1.5 mmol equivalents when calculated as —SO$_3^-$ group per gram of the polymer.

In a preferred embodiment of the invention, the polyester aqueous dispersion is solid in appearance and by adding water thereto, the solid component is uniformly dispersible in an aqueous phase as fine particles.

Therefore, the present invention also provides an polyester aqueous dispersion in which the polyester aqueous dispersion is dispersed in water or in a basic aqueous solution.

Furthermore, the invention provides, as a method that can provide such an excellent polyester aqueous dispersion, a method which comprises a step of melt-kneading a resin composition comprising (i) a water-insoluble polyester and (ii) a polyester containing a sulfonate group bound to a polymer in a concentration of 0.1 to 1.5 mmol equivalents when calculated as —SO$_3^-$ group per gram of the polymer and a step of phase inversion of adding water or a basic aqueous solution to the molten kneaded mixture thereby to shift the resin composition into the aqueous dispersion.

In a preferred method of the invention, water or a basic aqueous solution is added in the phase inversion step in such an amount that the polyester aqueous dispersion contains 1 to 40 wt % of water or a basic aqueous solution.

In a still preferred embodiment of the invention, the method comprises performing the melt-kneading step and the phase inversion step described above, by means of a twin screw extruder.

SPECIFIC EMBODIMENTS OF THE INVENTION

Hereinafter the polyester aqueous dispersion of the invention and the method for preparing the same will be described in more detail.

The polyester aqueous dispersion of the present invention is a polyester aqueous dispersion comprising:

(A) a water-insoluble polyester (i) and, (B) a polyester (ii) containing a sulfonate group bound to a polymer in a concentration of 0.1 to 1.5 mmol equivalents when calculated as —SO$_3^-$ group per gram of the polymer.

(A) Water-insoluble Polyester (i)

The water-insoluble polyester (i) referred to above is a polyester that is not uniformly soluble, swollen or dispersible in water or warm water and includes various types of polyester such as an aromatic polyester, an aliphatic polyester, a saturated polyester, an unsaturated polyester, etc.

The water-insoluble polyester which can be used in the present invention is a polycondensation product mainly between an acid component monomer and an alcohol component monomer.

Examples of the acid component monomer include terephthalic acid, isophthalic acid, orthophthalic acid, a naphthalenedicarboxylic acid, 4,4-diphenyldicarboxylic acid, trimellitic acid, trimesic acid, pyromellitic acid, benzoic acid, p-oxybenzoic acid, p-(hydroxyethoxy)benzoic acid, succinic acid, adipic acid, azelaic acid, sebacic acid, glutaric acid, suberic acid, brassylic acid, dodecanedicarboxylic acid, fumaric acid, maleic acid, itaconic acid, 1,4-cyclohexanedicarboxylic acid, 1,3-cyclohexanedicarboxylic acid, hexahydroorthophthalic acid, tricyclodecanedicarboxylic acid, tetrahydroterephthalic acid, tetrahydroorthopthalic acid, etc., or methyl esters of these acids and or anhydrides of the acids.

Among these acid component monomers, terephthalic acid, isophthalic acid, adipic acid, sebacic acid and trimellitic anhydride are preferably employed. These acid component monomers may be employed singly or in a combination of two or more.

Examples of the alcohol component monomers include ethylene glycol, diethylene glycol, triethylene glycol, tetraethylene glycol, propylene glycol, dipropylene glycol, 1,3-propanediol, 2-methyl-1,3-propanediol, 1,4-butanediol, 1,2-butanediol, 1,5-pentanediol, 2-methyl-1,5-pentanediol, 1,6-hexanediol, neopentyl glycol, 2-ethyl-2-butyl-1,3-propanediol, 1,8-octanediol, 1,9-nonanediol, 1,10-decanediol, 2,2,4-trimethyl-1,3-pentanediol, polyethylene glycol, polypropylene glycol, polytetramethylene glycol, trimethylolpropane, trimethylolethane, glycerin, pentaerythritol, bisphenol-based ethylene oxide adduct, bisphenol-based propylene oxide, 1,4-cyclohexanedimethanol, 1,4-cyclohexanediol, 1,3-cyclohexanedimethanol, 1,3-cyclohexanediol, hydrogenated bisphenol-A, spiroglycol, tricyclodecanediol, tricyclodecanedimethanol, resorcinol, 1,3-bis(2-hydroxyethoxy)benzene, etc. Of these monomers, ethylene glycol, diethylene glycol, triethylene glycol, 1,4-butanediol and neopentyl glycol are preferably used. These alcohol component monomers may be employed alone or in a combination of two or more.

(B) Polyester (ii)

The polyester (ii) used in the present invention is also a polycondensation product mainly between an acid component monomer and an alcohol component monomer but contains a sulfonate group bound to the polymer. In addition to the acid component monomers and the alcohol component monomers used in the water-insoluble polyester described above, the polyester (ii) further contains, as sulfonic acid-containing monomer, 5-sulfophthalic acid, sulfoterephthalic acid, 4-sulfophthalic acid, 5-(p-sulfophenoxy)isophthalic acid, 5-(sulfopropoxy)isophthalic acid, 4-sulfonaphthalene-2,7-dicarboxylic acid, sulfopropylmalonic acid, sulfosuccinic acid, 2-sulfobenzoic acid, 3,2-sulfobenzoic acid, 5-sulfosalicylic acid and methyl esters of these carboxylic acids, or metal salts or ammonium salts of these sulfonic acids, etc. Among them, sodium 5-sulfonate or dimethyl sodium salt of 5-sulfoisophthalate is preferably used.

The sulfonic acid-containing monomer is preferably used in such an amount that the polyester (ii) is contained in a concentration of 0.1 to 1.5 mmol equivalents, when calculated as —SO$_3^-$ per 1 gram of the polymer, more preferably 0.2 to 1.0 mmol equivalent. When the sulfonic acid-containing monomer is contained in this range of concentration in the polyester (ii), desired results are obtained in terms of hygroscopic, waterproof and weatherproof properties of the films or fine particles obtained from the aqueous dispersion as well as productivity.

Furthermore, the polyester (ii) used in the present invention is preferably selected from those having good compatibility to the water-insoluble polyester (i) of interest. When, e.g., the water-insoluble polyester (i) of aromatic type is chosen, it is preferred to use the polyester (ii) of aromatic type having similar constituent components.

A weight ratio of the water-insoluble polyester (i) to the polyester (ii) which can be used in the present invention is preferably in the range of 95/5 to 50/5, more preferably 90/10 to 60/40.

Aqueous Dispersion

The polyester aqueous dispersion of the present invention described above is mainly composed of the water-insoluble polyester (i) and the polyester (ii) and is an excellent aqueous dispersion containing (i) and (ii). Any method can be used without any particular limitation so long as such an excellent aqueous dispersion is obtained but the following method is proposed in view of high efficiency, low costs and easy procedures.

That is, the method preparing the polyester aqueous dispersion comprises a step of melt-kneading a resin composition comprising the water-insoluble polyester (i) and the polyester (ii)containing the sulfonate group bound to a polymer in a concentration of 0.1 to 1.5 mmol equivalents when calculated as —$SO_3^-$ group per gram of the polymer and a step of phase inversion of adding water or a basic aqueous solution to the molten kneaded mixture thereby to shift the resin composition into the aqueous dispersion.

In a preferred method of the invention, water or a basic aqueous solution is added in the phase inversion step above in such an amount that the polyester aqueous dispersion contains 1 to 40 wt %, preferably 15 to 30 wt % of water or a basic aqueous solution.

The means for melt-kneading that can be utilized for the method of the present invention is not limitative but can be exemplified by a twin screw extruder, a single screw extruder, a kneader and a Banbury mixer as preferred examples.

Among others, a preferred embodiment of the invention is the method in which both the step of melt kneading and the step of phase inversion are performed using a twin screw extruder.

Examples of the basic aqueous solution used in the present invention include an aqueous solution of the following substances that act as bases in water, for example, an alkali metal, an alkaline earth metal, ammonia and an amine, the oxides, hydroxides, weakly acidic salts or hydrides of alkali metal, the oxides, hydroxides, weakly acidic salts or hydrides of alkaline earth metal and, the alkoxides of these metals. More specifically, examples of these substances used in the basic aqueous solution include sodium, potassium, calcium, strontium, barium, an inorganic amine such as hydroxylamine or hydrazine, methylamine, ethylamine, ethanolamine, cyclohexylamine, sodium oxide, sodium peroxide, potassium oxide, potassium peroxide, strontium oxide, barium oxide, sodium hydroxide, potassium hydroxide, calcium hydroxide, strontium hydroxide, barium hydroxide, sodium hydride, potassium hydride, calcium hydride, sodium carbonate, potassium carbonate, sodium hydrogencarbonate, potassium hydrogencarbonate, calcium hydrogencarbonate, sodium acetate, potassium acetate, calcium acetate, ammonium hydroxide, a quaternary ammonium compound such as tetramethylammonium hydroxide, a hydrazine hydrate, etc.

In the high solid polyester aqueous dispersion and the preparation thereof of the present invention, various auxiliary materials that can be conventionally used in an aqueous dispersion may be used, if necessary and desired. These auxiliary materials include dispersing agents, emulsifying agents, surfactants, stabilizers, wetting agents, thickening agents, foaming agents, defoaming agents, coagulating agents, gelling agents, anti-settling agents, antistatic controllers, antistatic agents, antiaging agents, softeners, plasticizers, fillers, coloring agents, reodorants, anti-tack or anti-block agents, mold release agents, etc.

The thus obtained polyester aqueous dispersion is a high solid polyester aqueous dispersion, which looks like a solid in appearance. By adding water, the solid component in the high solid aqueous dispersion can be homogeneously and uniformly dispersed in the aqueous phase as fine particles. The solid content of the dispersion is preferably at least 60 wt %, more preferably 70 wt % or more.

In the case that the solid component is apparently separated from the liquid or the solid component can not be uniformly dispersed in the aqueous phase even though water (including warm water) is added thereto, the solid component is not completely dispersed in aqueous phase and such is not preferred.

Anionic Surfactant

According to the present invention, an anionic surfactant may be added to the aqueous dispersion, if necessary and desired, whereby the water dispersibility of the polyester can be improved.

Any anionic surfactants are usable so long as they react with basic substances to function as anion surfactants. Examples of such anionic surfactants are primary higher fatty acid salts, secondary higher fatty acid salts, primary higher alcohol sulfuric acid ester salts, secondary higher alcohol sulfuric acid ester salts, higher alkyl disulfonates, sulfonated higher fatty acid salts, higher fatty acid sulfates, higher fatty acid ester sulfonates, sulfuric acid ester salts of higher alcohol ether, sulfuric acid salts of higher alcohol ether, alkylol sulfuric acid ester salts of higher fatty acid amide, alkylbenzenesulfonates, alkylphenolsulfonates, alkylnaphthalenesulfonates, alkylbenzimidazolesulfonates, etc.

More specific examples of these surfactants are disclosed in, e.g., Hiroshi Horiguchi, "Gosei Kaimen Kasseizai (Synthetic Surfactants)", 1966, published by Sankyo Publishing Co., Ltd. Of these surfactants, alkylbenzenesulfonates are particularly suitable for use, more specifically, sodium dodecylbenzenesulfonate. For incorporating these surfactants, they may be formulated as raw materials, together with the water-insoluble polyester (i) and the polyester (ii). Alternatively, the surfactants may be previously dissolved in water and the resulting aqueous solution may be added to the system at the phase inversion step.

The surfactant may be employed within such a range that does not lower the waterproof, weatherproof, etc. properties of the coatings or fine particles obtained from the aqueous dispersion. In general, the surfactant is added preferably in an amount of 10 wt % or less based on the weight of the polyester aqueous dispersion, more preferably 3 wt % or less.

Dispersing the Aqueous Dispersion in Water

As described above, the polyester aqueous dispersion obtained in the present invention is preferably a high solid polyester aqueous dispersion which looks like a solid in appearance and by adding water to the aqueous dispersion, the solid component can be dispersed uniformly in the aqueous phase.

It is preferred that by adding water, the solid component in the dispersion can be uniformly dispersed in the aqueous phase as fine particles having a 50% volume average particle diameter of 0.1 to 10 μm, more preferably 0.2 to 5 μm.

The polyester aqueous dispersion obtained in the present invention may be added further with water or the basic aqueous solution (including warm water), if necessary and desired, followed by stirring. Thus, the polyester aqueous dispersion becomes a fluid aqueous dispersion, which can be cooled to room temperature spontaneously or artificially. By further dispersing the polyester aqueous dispersion uniformly in water, physical properties such as solid content level, viscosity and pH, etc. can be extensively adjusted. Alternatively, the polyester aqueous dispersion can be dried to powders and handled as powders. The polyester type resins in the form of the aqueous dispersion or powders so prepared retain the same excellent properties in waterproof, weatherproof, processibility, adhesion, etc. as the original polyester aqueous dispersion possesses.

The polyester aqueous dispersion of the present invention can be widely used for various applications, utilizing its excellent waterproof, weatherproof, processibility and adhesion. For example, the polyester aqueous dispersion may be used, as an aqueous dispersion, for primers of various base materials, adhesives, paints or coating agents for a variety of plastic films, metals such as aluminum, iron, copper, etc., paper, fibers, nonwoven cloth, woods, etc. More specifically, the polyester aqueous dispersion may be employed as coating agents for cans, binders of anticorrosive paints for metal surface (Al, steel plate, etc.), ink binders for ink jet, surface coating agents of paper and films for ink jet printer, surface coating agents for OHP films, binders for paper or thermal transfer ink ribbons, gas barrier-imparting agents to films, binders for wall paper by paper coating, fiber coating materials, nylon or polyester fiber greige agents, sizing and adhesive agents for cans or nonwoven cloth, adhesives for polyester films, thermal adhesives for sterilized paper, anti-abrasives and anti-slip controlling agents for ink or paints, chipping resistance improving agents for car paints (inner coat, top coat), electro-deposit paints for automobiles, paints for industrial use used for coating steel tubes, traffic signals or guard rails, dispersing agents for organic or inorganic solids such as pigments or fillers.

The powders obtained by drying the aqueous dispersion are applicable also to toners for electrophotography, toner additives, surface treatment agents for toners, powder paints for electrostatic coating, powder paints for fluidization dip coating, rheological regulation, etc.

EXAMPLES

Hereinafter the present invention will be described with reference to preferred Examples and Comparative Examples but is not deemed to be limited in any aspect.

Compositions of the water-insoluble polyester (i) and the polyester (ii) containing a sulfonate group bound to a polymer in a concentration of 0.1 to 1.5 mmol equivalents when calculated as —$SO_3^-$ group per gram of the polymer (referred to as polyester (ii) in the following Examples), which were used in the Examples, are shown in Table 1. In the Examples, parts are all by weight. Various data of characteristics were determined by the following methods.
(1) Dispersion State of Aqueous Dispersions Aqueous dispersions were passed through a 100 mesh gauze to examine the dispersed state.
(2) Particle Diameter of Aqueous Dispersions ($\mu$m)

A 50% volume average particle diameter was measured with Microtrack HRA (made by Honeywell, Inc.).
(3) pH of Aqueous Dispersions A pH was measured with a pH meter (made by HORIBA)
(4) Adhesion of Coating Adhesion was determined according to ASTM D-3359.
(5) Waterproof of Coating Waterproof was determined according to JIS K-5400.

PREPARATION EXAMPLE 1

Water-insoluble Polyester (i)-1

In a reaction vessel 83 parts of terephthalic acid, 83 parts of isophthalic acid, 62 parts of ethylene glycol and 0.1 part of dibutyltin oxide were charged followed by gradually elevating the temperature from 140° C. to 250° C. While removing the released water, ester exchange reaction was carried out for 6 hours. Next, polycondensation was performed over 2 hours under reduced pressure while elevating the temperature from 250° C. to 280° C. Thus, water-insoluble polyester (i)-1 was obtained. The composition of the resulting polyester is shown in Table 1.

PREPARATION EXAMPLE 2

Water-insoluble Polyester (i)-2

In a reaction vessel 50 parts of terephthalic acid, 50 parts of isophthalic acid, 58 parts of adipic acid, 31 parts of ethylene glycol, 53 parts of diethylene glycol and 0.1 part of dibutyltin oxide were charged followed by gradually elevating the temperature from 140° C. to 220° C. While removing the released water, ester exchange reaction was carried out for 6 hours. Next, polycondensation was performed over 2 hours under reduced pressure while elevating the temperature from 220° C. to 250° C. Thus, water-insoluble polyester (i)-2 was obtained. The composition of the resulting polyester is shown in Table 1.

PREPARATION EXAMPLE 3

Polyesters (ii)-1 to (ii)-3

Polyesters (ii)-1 to (ii)-3 were prepared in a manner similar to Preparation Example 1 except that the monomers and monomer ratios given in Table 1 were used in place of those in Preparation Example 1. The compositions of the thus prepared polyesters and the —$SO_3^-$ molar concentrations per gram of the resins are summarized in Table 1.

TABLE 1

| Composition (mol %) | Water-insoluble polyester | | Polyester (ii) | | |
| --- | --- | --- | --- | --- | --- |
| | (i)-1 | (i)-2 | (ii)-1 | (ii)-2 | (ii)-3 |
| Terephthalic acid | 50 | 30 | 40 | 47 | 20 |
| Isophthalic acid | 50 | 30 | 50 | 50 | 50 |
| Adipic acid | — | 40 | — | — | — |
| Na 5-sulfoisophthalate | — | — | 10 | 3 | 30 |
| Ethylene glycol | 100 | 50 | 100 | 100 | 100 |
| Diethylene glycol | — | 50 | — | — | — |
| Concentration of sulfonate group (mmol/g) | — | — | 0.45 | 0.14 | 1.24 |

EXAMPLE 1

A mixture of 70 parts of water-insoluble polyester (i)-1, 30 parts of polyester (ii)-1 and 1 part of sodium dodecylbenzenesulfonate as an anionic surfactant was fed in a co-rotating twin screw extruder (manufactured by Ikegai Iron Works, Ltd., PCM-30, L/D=40) at a rate of 101 parts/hour, melt kneaded at a set temperature of 240° C. and a screw speed of 150 rpm. At the same time, water was continuous fed at a feeding rate of 30 parts/hour through a feed opening at the middle of the extruder. The mixture of the resins extruded was passed through a single screw extruder equipped at an outlet of the former extruder to cool to 90° C. and discharge. The discharged mixture was a white solid and the solid content was 77 wt % when calculated from the weight difference before and after drying. When the aqueous dispersion was added to warm water, the solid component was finely dispersed to give white aqueous dispersion. When the solid content was adjusted to 30 wt %, and then filtered through a 100 mesh gauge, any non-dispersed matter was not noted, indicating that the dispersed state was good. The 50% volume average particle diameter of the aqueous dispersion was 0.6 μm, showing pH of 5. The aqueous dispersion was coated onto a corona-treated polyethylene terephthalate film of 125 μm thick in 5 μm thick as a film thickness after drying using a bar coater, followed by drying at 120° C. for 30 minutes. Adhesion of the coating thus obtained was good. After the film was immersed in water at 25° C. for 3 days or at 60° C. for 2 hours, the coating was observed but each caused no whitening and showed good adhesion as well as excellent waterproof. The preparation conditions and evaluations described above are shown in Table 2.

EXAMPLE 2

An aqueous dispersion was prepared in a manner similar to Example 1 except that 50 parts of water-insoluble polyester (i)-1 instead of 70 parts and 50 parts of polyester (ii)-2 instead of 30 parts of (ii)-1 were employed and the water feeding rate was changed to 25 parts/hour. The aqueous dispersion obtained was similarly evaluated. The preparation conditions and evaluations described above are shown in Table 2.

EXAMPLE 3

An aqueous dispersion was prepared in a manner similar to Example 1 except that 80 parts of water-insoluble polyester (i)-1 instead of 70 parts and 20 parts of polyester (ii)-3 instead of 30 parts of (ii)-1 in Example 1, were employed and the water feeding rate was changed to 50 parts/hour. The resulting aqueous dispersion was similarly evaluated. The preparation conditions and evaluations described above are shown in Table 2.

EXAMPLE 4

An aqueous dispersion was prepared in a manner similar to Example 1 except that 70 parts of water-insoluble polyester (i)-2 were used instead of 70 parts of (i)-1 in Example 1. The resulting aqueous dispersion was similarly evaluated. The preparation conditions and evaluations described above are shown in Table 2.

EXAMPLE 5

An aqueous dispersion was prepared in a manner similar to Example 2 except that 50 parts of water-insoluble polyester (i)-2 were used instead of 50 parts of (i)-1 in Example 2. The resulting aqueous dispersion was similarly evaluated. The preparation conditions and evaluations described above are shown in Table 2.

EXAMPLE 6

An aqueous dispersion was prepared in a manner similar to Example 3 except that 80 parts of water-insoluble polyester (i)-2 were used instead of 80 parts of (i)-1 in Example 3. The resulting aqueous dispersion was similarly evaluated. The preparation conditions and evaluations described above are shown in Table 2.

EXAMPLE 7

An aqueous dispersion was prepared in a manner similar to Example 1 except that 1N sodium hydroxide aqueous solution was fed at a rate of 30 parts/hour, instead of feeding water at 30 parts/hour in Example 1. The resulting aqueous dispersion was similarly evaluated. The preparation conditions and evaluations described above are shown in Table 2.

EXAMPLE 8

An aqueous dispersion was prepared in a manner similar to Example 1 except that sodium dodecylbenzenesulfonate used as an anionic surfactant in Example 1 was omitted. The resulting aqueous dispersion was similarly evaluated. The preparation conditions and evaluations described above are summarized in Table 2.

COMPARATIVE EXAMPLE 1

The same procedures as in Example 1 were repeated except that 100 parts of polyester (ii)-1 alone was employed, instead of using 70 parts of water-insoluble polyester (i)-1 and 30 parts of (ii)-1. An aqueous dispersion having solid content of 77 wt % was obtained. The aqueous dispersion obtained was similarly evaluated as in Example 1. The preparation conditions and evaluations described above are summarized in Table 2.

COMPARATIVE EXAMPLE 2

The same procedures as in Example 3 were repeated except that the water feeding rate was changed from 50 parts/hour to 80 parts/hour. However, no aqueous dispersion was obtained. The preparation conditions and evaluations described above are shown in Table 2.

COMPARATIVE EXAMPLE 3

The same procedures as in Example 7 were repeated except that 30 parts of ethylene-acrylic acid copolymer (manufactured by Allied Chemical, Inc., AC-5120, acrylic acid content, 15 wt %) were employed instead of 30 parts of polyester (ii)-1 in Example 7. However, no aqueous dispersion was obtained. The preparation conditions and evaluations described above are shown in Table 2.

TABLE 2

| Example No. | 1 | 2 | 3 | 4 | 5 | 6 | 7 | 8 | Comp. Ex. 1 | Comp. Ex. 2 | Comp. Ex. 3 |
|---|---|---|---|---|---|---|---|---|---|---|---|
| Water-insoluble polyester (i) (parts by weight) | | | | | | | | | | | |
| (i)-1 | 70 | 50 | 80 | — | — | — | 70 | 70 | — | 80 | 70 |
| (i)-2 | — | — | — | 70 | 50 | 80 | — | — | — | — | — |

TABLE 2-continued

| Example No. | 1 | 2 | 3 | 4 | 5 | 6 | 7 | 8 | Comp. Ex. 1 | Comp. Ex. 2 | Comp. Ex. 3 |
|---|---|---|---|---|---|---|---|---|---|---|---|
| Polyester (ii) (parts by weight) | | | | | | | | | | | |
| (ii)-1 | 30 | — | — | 30 | — | — | 30 | 30 | 100 | — | ethylene- |
| (ii)-2 | — | 50 | — | — | 50 | — | — | — | — | — | acrylic acid |
| (ii)-3 | — | — | 20 | — | — | 20 | — | — | — | 20 | copolymer (*) |
| Sodium dodecylbenzenesulfonate (parts by weight) | 1 | 1 | 1 | 1 | 1 | 1 | 1 | — | 1 | 1 | 1 |
| Amount of water added (parts by weight) | 30 | 25 | 50 | 30 | 26 | 50 | — | 30 | 30 | 80 | — |
| Amount of 1 N sodium hydroxide added (parts by weight) | — | — | — | — | — | — | 30 | — | — | — | 30 |
| Solid content (wt %) | 77 | 80 | 67 | 80 | 72 | 67 | 77 | 77 | 77 | — | — |
| Dispersibility | | | | | | | | | | | |
| dispersed state | ○ | Δ | ○ | Δ | ○ | ○ | ○ | Δ | ○ | — | — |
| particle diameter (μm) | 0.5 | 1 | 0.5 | 4 | 2 | 3 | 7 | 8 | <0.5 | — | — |
| pH | 5 | 5 | 5 | 5 | 5 | 5 | 7 | 5 | 5 | — | — |
| Adhesion | 100 | 100 | 100 | 90 | 90 | 80 | 90 | 80 | 20 | — | — |
| Waterproof | | | | | | | | | | | |
| 25° C., 3 days after immersion — adhesion appearance | ○ | ○ | ○ | ○ | ○ | Δ | ○ | ○ | — | — | — |
| 60° C., 2 hours after immersion — adhesion | 100 | 100 | 90 | 80 | 90 | 80 | 90 | 80 | — | — | — |
| appearance | ○ | ○ | Δ | Δ | ○ | Δ | ○ | ○ | — | — | — |

(*): acrylic acid, 15 wt %.

APPLICABILITY TO INDUSTRIES

According to the present invention, polyester aqueous dispersions having excellent properties in waterproof, weatherproof, processability and adhesion, which provide a large allowance for controlling physical properties by post treatment and are advantageous in making dry powders, can be efficiently prepared at low costs in a simple way. The polyester aqueous dispersion of the present invention can be utilized in the form of an aqueous dispersion extensively to various applications because of excellent waterproof, weatherproof, processability and adhesion, e.g., as primers for various base materials of various plastic films, metals such as aluminum, iron, copper, etc., paper, fibers, non-woven cloth or woods. Further by drying the polyester aqueous dispersion, the resulting powders may be used as toners for electrophotography, additives to toners, powder paints for electrostatic coating, powder paints for fluidization dip coating, etc.

What is claimed is:

1. A polyester aqueous dispersion comprising:
   (A) a water-insoluble polyester (i) and,
   (B) a polyester (ii) containing a sulfonate group bound to a polymer in a concentration of 0.1 to 1.5 mmol equivalents when calculated as —SO$_3^-$ group per gram of the polymer,
   wherein the polyester aqueous dispersion is solid in appearance and its solid component can be uniformly dispersible in an aqueous phase as fine particles by adding water to the aqueous dispersion.

2. The polyester aqueous dispersion according to claim 1, wherein the solid content is in a range of 60 to 99 wt %.

3. The polyester aqueous dispersion according to any one of claims 1 and 2, which contains solid particles having a volume 50% average particle diameter of 0.1 to 10 μm that can be uniformly dispersed in water by adding water to the aqueous dispersion.

4. The polyester aqueous dispersion according to claim 1, wherein a weight ratio of said water-insoluble polyester (i) to said polyester (ii) is in a range of 95/5 to 50/50.

5. The polyester aqueous dispersion according to any one of claims 1 and 2, which further contains an anionic surfactant.

6. An aqueous dispersion in which said polyester aqueous dispersion defined in claim 1 is dispersed in water or a basic aqueous solution.

7. A method for preparing a polyester aqueous dispersion which comprises
   a step of melt-kneading a resin composition comprising (i) a water-insoluble polyester and (ii) a polyester containing a sulfonate group bound to a polymer in a concentration of 0.1 to 1.5 mmol equivalents when calculated as —SO$_3^-$ group per gram of the polymer
   and a step of phase inversion of adding water or a basic aqueous solution to the molten kneaded mixture thereby to shift the resin composition into the aqueous dispersion.

8. The method for preparing a polyester aqueous dispersion according to claim 7, wherein water or the basic aqueous solution is added in such an amount that the polyester aqueous dispersion contains 1 to 40 wt % of water or the basic aqueous solution.

9. The method for preparing a polyester aqueous dispersion according to claim 7 or 8, wherein the step of melt-kneading and the step of phase inversion are performed by means of a twin screw extruder.

10. The polyester aqueous dispersion according to claim 1, wherein the water-insoluble polyester (i) is a polycondensation product of an acid acid component monomer and an alcohol component monomer.

11. The polyester aqueous dispersion according to claim 10, wherein the acid component monomer is selected from at least one selected from the group consisting of terephthalic acid, isophthalic acid, orthophthalic acid, naphthalenedicarboxylic acid, 4,4-diphenyldicarboxylic acid, trimellitic acid, trimesic acid, pyromellitic acid, benzoic acid, p-oxybenzoic acid, p-(hydroxyethoxy)benzoic acid, succinic acid, adipic acid, azelaic acid, sebacic acid, glutaric acid, suberic acid, brassylic acid, dodecanedicarboxylic acid, fumaric acid, maleic acid, itaconic acid, 1,4-cyclohexanedicarboxylic acid, 1,3-cyclohexanedicarboxylic acid, hexahydroorthophthalic acid, tricyclodecanedicarboxylic acid, tetrahydroterephthalic acid, tetra-hydroorthophthalic acid, methyl ester thereof and anydride thereof.

12. The polyester aqueous dispersion according to claim 10, wherein the alcohol component monomer is at least one selected from the group consisting of ethylene glycol, diethylene glycol, triethylene glycol, tetraethylene glycol, propylene glycol, dipropylene glycol, 1,3-propanediol, 2-methyl-1,3-propanediol, 1,4-butanediol, 1,2-butanediol, 1,5-pentanediol, 2-methyl-1,5-pentanediol, 1,6-hexanediol, neopentyl glycol, 2-ethyl-2-butyl-1,3-propanediol, 1,8-octanediol, 1,9-nonanediol, 1,10-decanediol, 2,2,4-trimethyl-1,3-pentanediol, polyethylene glycol, polypropylene glycol, poly-tetramethylene glycol, trimethylolpropane, trimethylolethane, glycerin, pentaerythritol, bisphenol-based ethylene oxide adduct, bisphenol-based propylene oxide, 1,4-cyclohexanedimethanol, 1,4-cyclohexanediol, 1,3-cyclohexanedimethanol, 1,3-cyclohexanediol, hydrogenated bisphenol-A, spiroglycol, tricyclodecanediol, tricyclodecanedimethanol, resorcinol, and 1,3-bis(2-hydroxyethoxy)benzene.

13. The polyester aqueous dispersion according to claim 1, wherein the polyester (ii) is a polycondensation product between an acid component monomer, an alcohol component monomer and a sulfonic acid-containing monomer.

14. The polyester aqueous dispersion according to claim 13, wherein the sulfonic-acid containing monomer is at least one selected from the group consisting of 5-sulfophthalic acid, sulfoterephthalic acid, 4-sulfophthalic acid, 5-(p-sulfophenoxy)isophthalic acid, 5-(sulfopropoxy)isophthalic acid, 4-sulfonaphthalene-2,7-di-carboxylic acid, sulfopropylmalonic acid, sulfosuccinic acid, 2-sulfobenzoic acid, 3,2-sulfobenzoic acid, 5-sulfosalicylic acid, methyl ester thereof, metal salt thereof, and ammonium salt thereof.

15. The polyester aqueous dispersion according to claim 1, wherein the polyester (ii) has a sulfonate group concentration of 0.2 to 1.0 mmol equivalents when calculated as —$SO_3^-$ group per gram of the polymer.

16. The method for preparing a polyester aqueous dispersion according to claim 7, wherein water or the basic aqueous solution is added in such an amount that the polyester aqueous dispersion contains 15 to 30 wt % of water or the basic aqueous solution.

17. The polyester aqueous dispersion according to claim 1, wherein the solid content is in a range of 70 wt % or more.

18. The polyester aqueous dispersion according to claim 1, wherein the water-insoluble polyester (i) is a polycondensation product of terephthalic acid, isophthalic acid and ethylene glycol and the polyester (ii) is a polycondensation product of terephthalic acid, isophthalic acid, sodium 5-sulfoisophthalate, and ethylene glycol.

19. The polyester aqueous dispersion according to claim 18, wherein the water-insoluble polyester (i) further comprises the monomers of adipic acid and diethylene glycol.

* * * * *